(12) United States Patent
Doi et al.

(10) Patent No.: US 7,476,009 B2
(45) Date of Patent: Jan. 13, 2009

(54) PROJECTOR

(75) Inventors: Naohito Doi, Osaka (JP); Masaki Ochi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 49 days.

(21) Appl. No.: 11/805,340

(22) Filed: May 23, 2007

(65) Prior Publication Data

US 2007/0274076 A1 Nov. 29, 2007

(30) Foreign Application Priority Data

May 25, 2006 (JP) ............................. 2006-145540

(51) Int. Cl.
*B60Q 1/00* (2006.01)
(52) U.S. Cl. .................. 362/370; 362/549; 353/119
(58) Field of Classification Search ................ 362/370, 362/549, 634; 353/18, 119
See application file for complete search history.

(56) References Cited

U.S. PATENT DOCUMENTS 5,267,128 A * 11/1993 Shamir et al. ............... 362/549

6,454,418 B2 * 9/2002 Lee et al. .................... 353/119

FOREIGN PATENT DOCUMENTS

| JP | 3092161 U | * 12/2002 |
| JP | 2004-347789 | * 12/2004 |
| JP | 2005-043603 | * 2/2005 |

* cited by examiner

*Primary Examiner*—Stephen F Husar
(74) *Attorney, Agent, or Firm*—Yokoi & Co., U.S.A., Inc.; Peter Ganjian

(57) ABSTRACT

The present invention discloses a projector comprising: a lamp module for receiving therein a lamp as a light source; an enclosure fixing said lamp module therein such that an optical axis of said lamp module is kept in a predetermined direction; two positioning pins provided on said lamp module and inserted into positioning holes made in a vertical direction to said enclosure for controlling movement of said lamp module in a horizontal plane; and a first rib provided on said enclosure as extended inward from an inner wall of a ceiling plate and second ribs provided on said enclosure as extended inward from an inner wall of a bottom plate, said lamp module is fixed in said enclosure and secured by one screw while said lamp module is positioned within a horizontal plane by said positioning pins, and further is vertically supported between said first rib and second ribs.

5 Claims, 8 Drawing Sheets

PROJECTOR

CROSS-REFERENCES TO RELATED APPLICATIONS

The present application is related to the Japanese Patent Application No. 2006-145540, filed May 25, 2006, the entire disclosure of which is expressly incorporated by reference herein.

BACKGROUND OF THE INVENTION (1) Field of the Invention

The present invention relates to a projector.

(2) Description of Related Art

FIG. 8 is a block diagram of a related projector. In FIG. 8, a projector 1 is configured of a lamp module 3 having received therein a lamp 3*a* as a light source disposed toward the front face side of an enclosure 2, an engine module 4 generating an image on the basis of light from the lamp, and a projecting lens 5 for projecting the image generated by the engine module 4. Light emitted from the lamp 3*a* as the light source is passed through the engine module 4 and a DMD 4*a* to be finally projected from the projecting lens 5. Therefore, the lamp module 3 for fixing the lamp 3*a* to the enclosure 2 is required to be securely fixed to the enclosure 2 so that the optical axis of light emitted from the light source may not deviate from the right path.

As a conventional method to fix a lamp module 3 to an enclosure 2 so that the optical axis may not deviate, there is known a technology to fixedly position the lamp module 3 in a horizontal direction and vertical direction with the use of a plurality of screws. In the fixation of the lamp module 3 with the use of a plurality of screws, it is naturally required that high positioning accuracy of the lamp module 3 is secured by each screw. Further, in the positioning of the lamp module 3, the datums would not easily match because of tolerances of the screws relative to their respective female screws and therefore the assembling work has taken a lot of trouble.

As a conventional method for fixing a lamp module to an enclosure such that the optical axis dose not deviate from a right path, there is known one having positioning planes arranged to support therebetween the upper and lower faces of the lamp module, a convexity formed on a face opposite to the light emitting face of the lamp module, and a coil spring to abut on the convexity when the lamp module is received into the enclosure. In this configuration, after the lamp module has been controlled in its vertical movement by the positioning faces, it is retained in place with the coil spring abutting on the convexity (refer to JU-3092161).

Also, to simplify the work of fixing and removing a lamp module to and from an enclosure with use of fixing screws, there is disclosed a method, which does not use tools but has ribs, coming into engagement with the fixing screws, formed on a lid, so that the fixing screws may be tightened or loosened by the ribs on the lid (refer to JP-A-2004-347789).

Further, there is disclosed a method to fix a lamp module to an enclosure by forming bosses on the lamp module and forming, opposite thereto, a slip preventing member on the side of the enclosure (refer to JP-A-2005-43603).

In the invention of the above mentioned patent document 1, since the positioning faces are provided by the inner wall of the enclosure and the lamp module is only supported therebetween, there has been a problem that the optical axis of the lamp module is easily deviated by a shock when for example the projector is dropped.

The invention disclosed in the patent document 2 is just for facilitating removal of the lamp module from the enclosure and therefore the deviation of the optical axis of light emitted from the lamp module cannot be prevented.

Further, in the case of the patent document 3, it was required to provide slip preventing members in the enclosure, and therefore, the shape of the enclosure receiving the lamp module therein naturally became complicated to take unnecessary cost for manufacturing the enclosure.

BRIEF SUMMARY OF THE INVENTION

The present invention discloses a projector comprising: a lamp module for receiving therein a lamp as a light source; an enclosure fixing said lamp module therein such that an optical axis of said lamp module is kept in a predetermined direction; two positioning pins provided on said lamp module and inserted into positioning holes made in a vertical direction to said enclosure for controlling movement of said lamp module in a horizontal plane; and a first rib provided on said enclosure as extended inward from an inner wall of a ceiling plate and second ribs provided on said enclosure as extended inward from an inner wall of a bottom plate, said lamp module is fixed in said enclosure and secured by one screw while said lamp module is positioned within a horizontal plane by said positioning pins, and further is vertically supported between said first rib and second ribs.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

A projector as an embodiment of the present invention will be described in the following order:

A. Configuration of the projector;
B. Method of fixation of the lamp module;
C. Example of variation; and
D. Summary.

A. Configuration of the Projector

Figure 1:
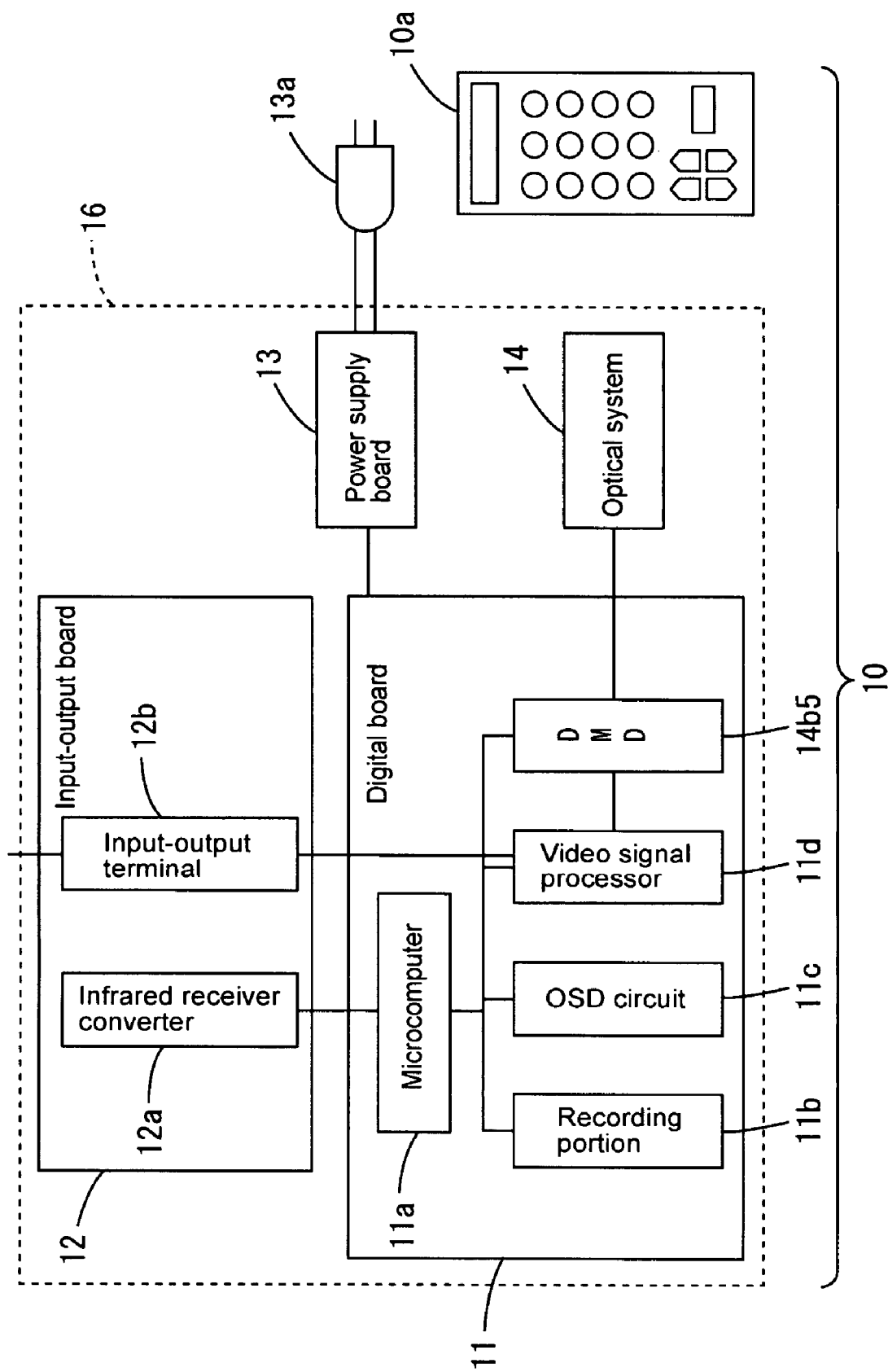
FIG. 1 is an exemplary diagram showing a block configuration of a projector.

Referring to FIG. 1-FIG. 8, an embodiment in which a projector according to the present invention is realized will be described. FIG. 1 is a block configuration diagram of the projector 10 according to the present invention. Referring to the diagram, the projector 10 has a box type enclosure 16. The enclosure 16 accommodates an optical system 14 for projecting an image by the use of light from a lamp, a digital board 11 for controlling the optical system 14, a power supply board 13 for providing the digital board 11 with necessary power supply, and an input-output board 12 for receiving a video signal and an audio signal from external equipment such as a personal computer and also accepting an operating signal transmitted from a remote controller 10a. Explanation of each component and explanation of functioning of the projector 10 will be given below.

The input-output board 12 mounts thereon an input-output terminal 12b and an infrared receiver converter 12a and it outputs signals from the input-output terminal 12b and infrared receiver converter 12a to the digital board 11. The input-output terminal 12b includes a video terminal and an audio terminal for receiving a video signal and an audio signal from external equipment such as a personal computer and it outputs the video signal and audio signal received through the video terminal and audio terminal to the digital board 11. The infrared receiver converter 12a receives an infrared operating signal transmitted from the remote controller 10a and, converting the received infrared signal into an operating signal having a predetermined voltage value, outputs the converted operating signal to the digital board 11. The output signals from the input-output terminal 12b and infrared receiver converter 12a are output to the digital board 11 through signal lines.

The digital board 11 has, mounted on one side thereof, IC devices and the like constituting a microcomputer 11a, a recording module 11b, a video signal processor 11d, and an OSD (on screen display) circuit 11c. Within the digital board 11, the microcomputer 11a is connected through buses with the recording module 11b, the video signal processor 11d, and the OSD circuit 11c. The microcomputer 11a accepts an operating signal from the infrared receiver converter 12a and issues, based on predetermined programs recorded on the recording module 11b, predetermined commands to the video signal processor 11d and OSD circuit 11c and also performs control all the circuits.

The video signal processor 11d separates the video signal input from the input-output terminal 12b through the signal line into RGB signal containing the three primary colors of red R, green G, and blue B, and thereafter, performs correction of the RGB signal for the color level or the like based on a control signal from the microcomputer 11a and outputs the corrected RGB signal to the optical system 14. The OSD circuit 11c, connected with the video signal processor 11d, generates an OSD signal representing the image to be OSD-displayed on the screen and superposes the generated signal on the video signal. The digital board 11, under the control of the microcomputer 11a, accepts the operating signal from the infrared receiver converter 12a and generates an OSD signal corresponding to the accepted operating signal.

The power supply board 13 rectifies an external power supply (for example, 100V commercial AC source), supplied from a wall socket 13a, by a rectifier composed of thyristors and, thereafter, generates again an AC power supply needed for operating the projector 10 and provides the power supply to the digital board 11 and optical system 14.

Figure 2:
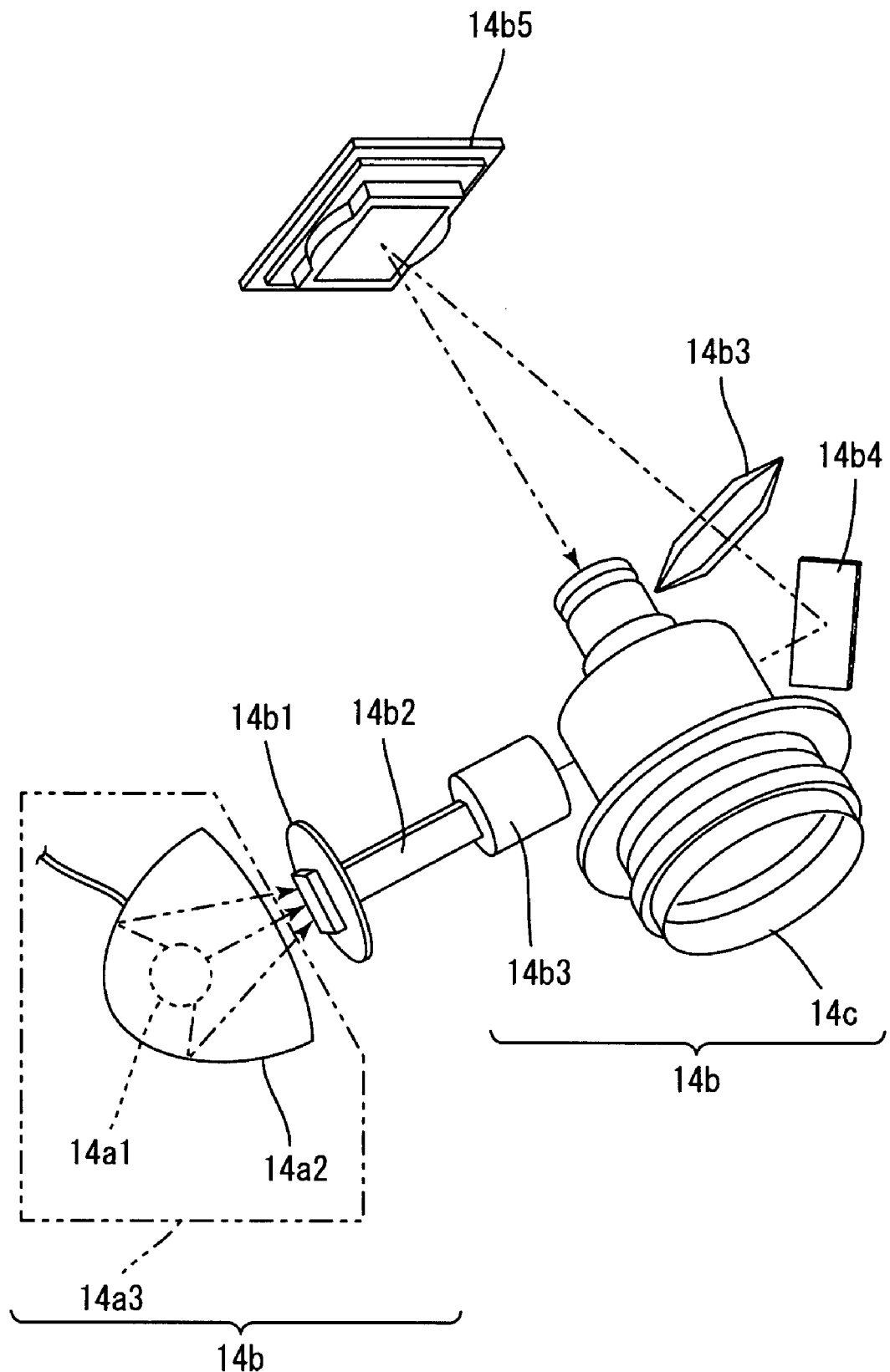
FIG. 2 is an exemplary drawing showing an optical system.

The optical system 14 generates RGB light based on the video signal generated by the video signal processor 11d, under the control of the microcomputer 11a, and project the generated light onto a screen or the like through a projecting lens. FIG. 2 is an arrangement drawing of an example of the optical system 14 of the present embodiment. In FIG. 2, the optical system 14 is made up of a lamp module 14a emitting light from a light source and an engine module 14b to cast light from the lamp module 14a along a predetermined optical axis to the outside. The lamp module 14a is made up of a lamp 14a1 as the light source, a lamp reflector 14a2 for focusing light from the lamp 14a1 along a predetermined direction, and a lamp case 15 for accommodating therein the lamp 14a1 and lamp reflector 14a2.

The engine module 14b is made up of a color wheel 14b1 for generating the three primary colors of R, G, and B from light emitted from the lamp module 14a, a light pipe 14b2 allowing the beams of light generated by the color wheel 14b1 to go straight, a mirror 14b4 for reflecting beams of light emitted from the light pipe 14b2, an illumination lens 14b3 for processing the beams of light into a predetermined shape, and a DMD 14b5 for reflecting incident beams of light thereon into a predetermined direction so as to be thrown on the projecting lens 14c. In FIG. 2, the dotted line indicates a trajectory of the optical axis in the optical system 14. Beams of light emitted from the lamp 14a1 as the light source are thrown on the DMD 14b5 with their optical axes kept constant.

In FIG. 2, the arrowhead of the two-dot chain line indicates the traveling direction of light. While light emitted from the lamp 14a1 is separated by the color wheel 14b1 into light of each color of R, G, and B, the separated light beams are collected by the light pipe 14b2 and guided toward the mirror 14b4. The light beams output from the light pipe 14b2 are condensed by the illumination lens 14b3 located between the light pipe 14b2 and mirror 14b4 and rendered incident on the mirror 14b4 and, then, reflected by the mirror 14b4. The reflected light beams from the mirror 14b4 are condensed by the illumination lens 14b3 and rendered incident on the DMD 14b5. Since the DMD 14b5 is of a known configuration, only a simple explanation will be given about the same here. The DMD 14b5 has a plurality of micro mirrors disposed on its reflecting face and generates an image by changing angles of the micro mirrors, thereby changing the positions of the reflected light beams. Therefore, deviation of the optical axis indicated by the dotted line in the drawing causes defects such as decrease in brightness of the image projected by the projecting lens 14c.

Figure 3:
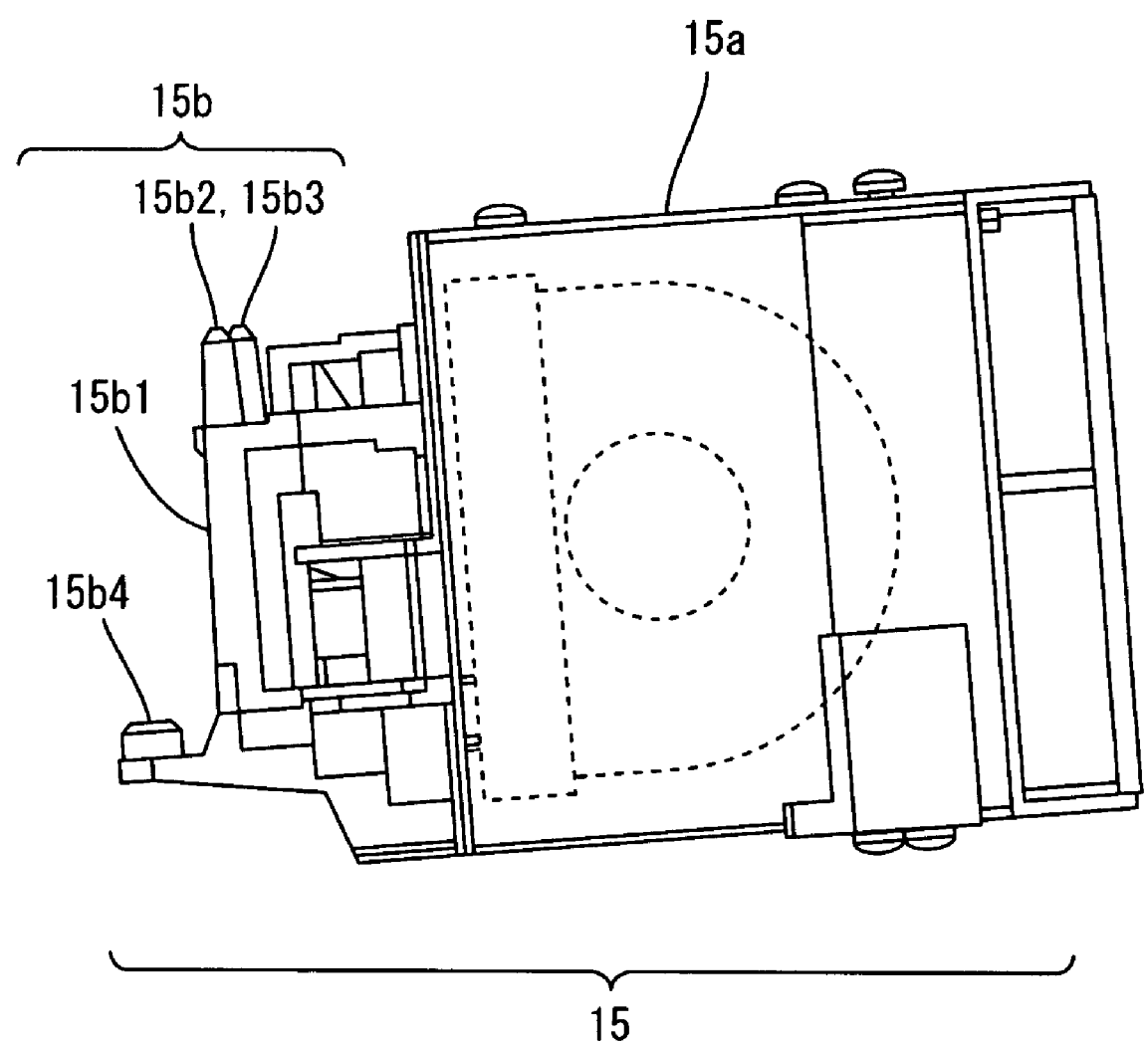
FIG. 3 is an exemplary drawing showing a lamp module.

FIG. 3 is a drawing showing the lamp module 14a of the present embodiment. In this drawing, the lamp case 15 is configured of a main body 15a provided with an opening for receiving the lamp reflector 14a2 therethrough, a light emitting window 15b1 through which light reflected from the lamp reflector 14a2a received into the main body 15a through the opening□ is emitted, and a positioning portion 15b for proper positioning when a lid is applied to the opening of the main body 15a to enclose the lamp reflector 14a2 therein. Although a closed type of lamp case 15 having the lamp 14a1 and lamp reflector 14a2 enclosed therein is used as the lamp module 14a in the present embodiment, the form of the lamp case 15 is not limited to such a one but any type of lamp case may be used if it can be fixed in the enclosure 16.

The positioning portion 15b of the lamp case 15 is provided with positioning pins 15b2, 15b3 and a boss 15b4 for a screw to be used, as described later, when the lamp case 15 is fixed in the enclosure 16. The positioning pins 15b2, 15b3 are embedded in the side face of the positioning portion 15b, in a vertical direction thereto. The boss 15b4 has a hole allowing a screw to be passed therethrough substantially in parallel to the extended direction of the positioning pins 15b2, 15b3. The positioning portion 15b of the lamp case is made of forged magnesium. Further, the positioning pins are formed integral with the positioning portion 15b to ensure precision. However, the structure of the positioning portion 15b need not necessarily be such that is described above but one made of a material and configured so as to meet precision requirements of the lamp case 15 may be used.

Figure 4:
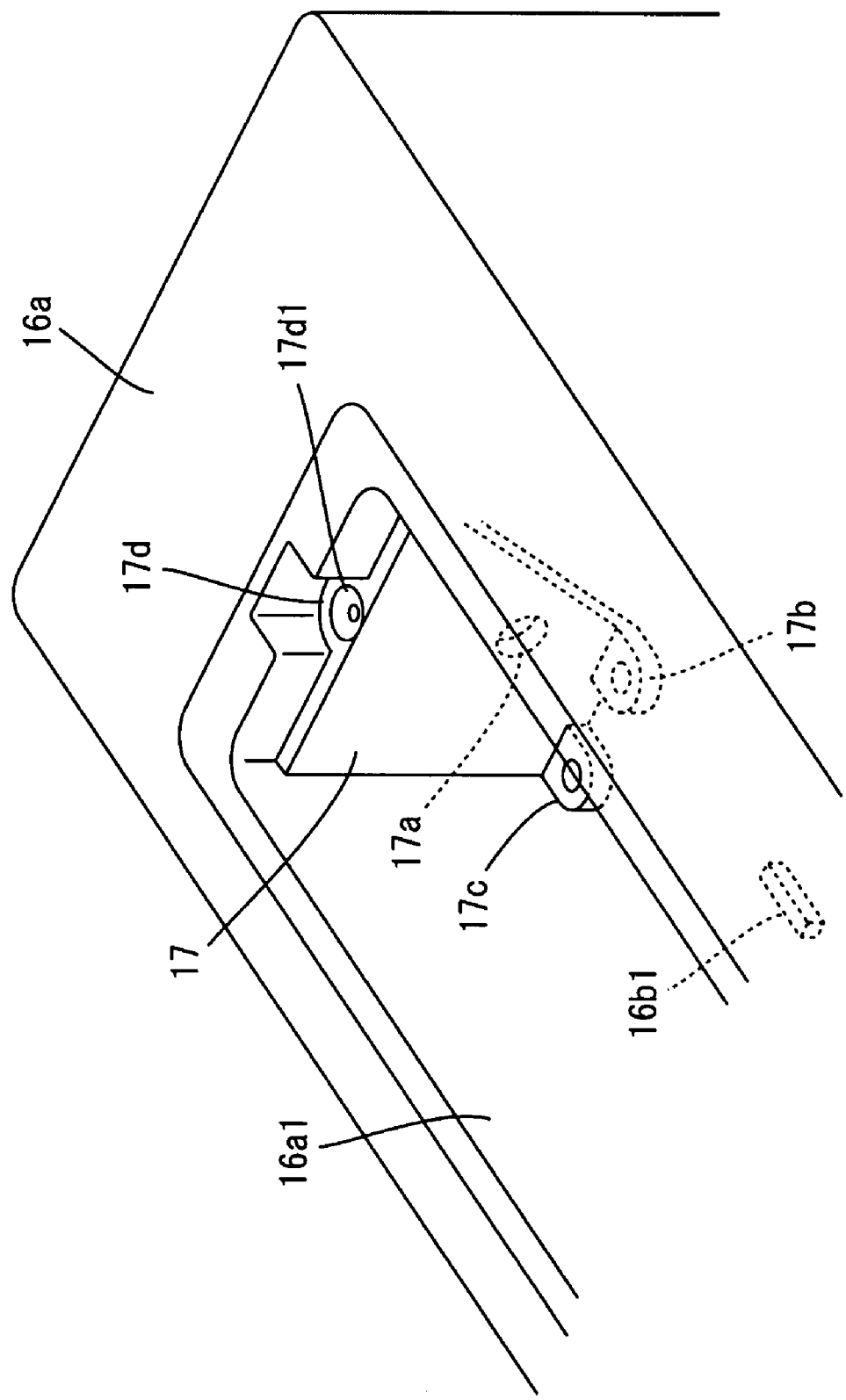
FIG. 4 is an exemplary bottom view of an enclosure.

The enclosure 16 is provided with an opening therein and the lamp case 15 is received on the bottom face thereof by having the opening covered with a lid. FIG. 4 is a view of the enclosure 16 seen from the bottom. Referring to FIG. 4, within a lamp module receiving portion 16a1 provided in the bottom face 16a, there is fixedly disposed a lamp case fixing portion 17 for transmitting light from the lamp module 14a to the engine module 14b through an optical path 17a. More specifically, the lamp case fixing portion 17 mounts thereon the engine module 14b and the optical path 17a allows light from the lamp module 14a transmitted to the engine module 14b.

In the lamp case fixing portion 17, toward the bottom of the drawing, there are provided positioning holes 17b, 17c which allow the positioning pins 15b2, 15b3 of the lamp case 15 to be inserted therein. In the lamp case fixing portion 17, toward the top of the drawing, there is provided a socket portion 17d; the socket portion 17d is adapted to receive the head of the boss 15b4 and provided with a female screw engaging a screw passed through the boss 15b4. The receiving face 17d1 of the socket portion 17d is formed into a cone concave shape, and this shape allows the head of the boss 15b4 to be put in. Thus, with the positioning pins 15b2, 15b3 of the lamp case 15 inserted into the positioning holes 17b, 17c and with the head of the boss 15b4 put into the receiving face 17d1, an inclination of the boss 15b4 can be absorbed. The lamp case fixing portion 17 of the present embodiment is made of magnesium the same as positioning portion 15b of the lamp case 15 so as to ensure positioning precision.

On the bottom face of the lamp module receiving portion 16a1, namely on the back side of the ceiling face thereof, there is provided a first rib 16b1 protruded a predetermined length. A concrete shape of the first rib 16b1 being described later, the first rib 16b1 and the bottom face 16a are formed integral with each other in the present embodiment.

Figure 5:
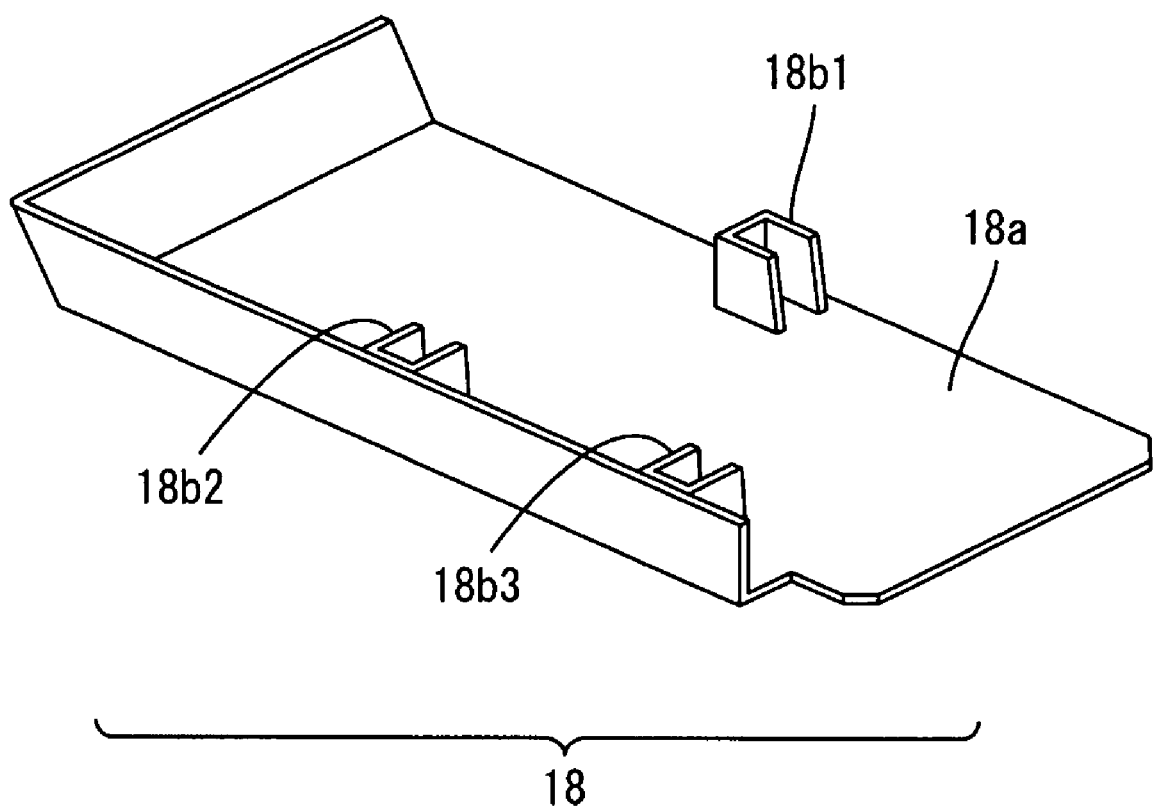
FIG. 5 is an exemplary drawing showing the shape of a lid member.

The projector 10 has a lid 18 for covering up the opening of the lamp module receiving portion 16a1 after the lamp module 14a has been received into the lamp module receiving portion 16a1. FIG. 5 is a drawing showing the shape of the lid. Referring to FIG. 5, the lid 18 is configured of a base portion 18a for covering up the opening of the lamp module receiving portion 16a1 and second ribs 18b1, 18b2, 18b3 erected substantially upright from the base portion 18a. The three second ribs 18b1, 18b2, 18b3 are arranged substantially triangularly and radially from the base portion 18a. The heights of the second ribs 18b1, 18b2, and 18b3 from the base portion 18a are made substantially equal to each other and they are integrally joined to the base portion 18a with a resin. Thus, when the opening of the lamp module receiving portion 16a1 is covered with the lid 18, the second ribs 18b1, 18b2, 18b3 come to positions opposite to the lamp module 14a.

Each of the second ribs 18b1, 18b2, and 18b3 has substantially a U-shaped cross-section. Therefore, in a state where the lamp module 14a is supported by the second ribs 18b1, 18b2, 18b3, vibrations transmitted from the lamp module 14a can be absorbed by the U-shaped cross-sections. Further, since the second ribs 18b1, 18b2, 18b3 are U-shaped and hence hollow-centered, shrinkage at the time of shaping the lid can be prevented and therefore the lid can be made to look nice.

Figure 6:
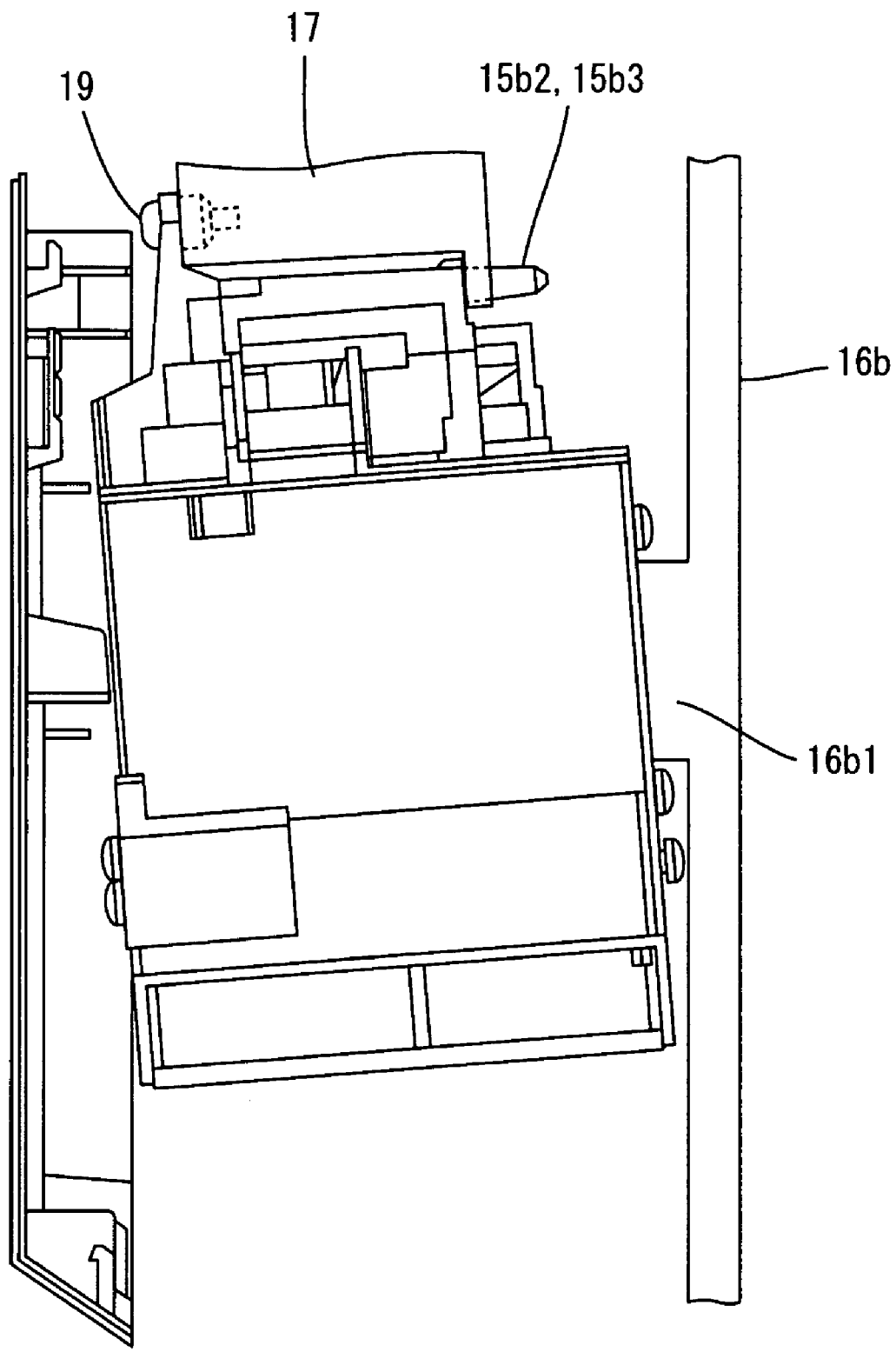
FIG. 6 is an exemplary drawing showing a lamp module fixed in an enclosure.

B. Method for Fixing the Lamp Module:

A method for fixing the lamp module 14a in place by the use of the enclosure 16 and the lid 18 will be described. FIG. 6 is a drawing showing a lamp module to be fixed in an enclosure. Referring to FIG. 6, in order to fix the lamp module 14a, the bottom face 16a of the enclosure 16 is first turned upward such that the opening of the lamp module receiving portion 16a1 looks upward. Then, the lamp module 14a is brought into the lamp module receiving portion 16a1. At this time, the positioning pins 15b2, 15b3 formed at the positioning portion 15b of the lamp case 15 are inserted into the positioning holes 17b, 17c of the lamp case fixing portion 17 within the lamp module receiving portion 16a1 and, at the same time, the boss 15b4 of the positioning portion 15b is inserted into the receiving face 17d1 of the socket portion 17d of the lamp case fixing portion 17. In this state, the boss 15b4 and socket portion 17d are fixed together by the screw 19.

Finally, with the opening of the lamp module receiving portion 16a1 covered with the lid 18, the enclosure 16 and the lid 18 are fixed together with screws. At this time, the lamp module 14a is controlled in its movement in a horizontal plane by the two positioning pins 15b2, 15b3 and the screw 19 and, at the same time, the lamp module 14a is vertically supported between the first rib 16b1 disposed on the back side of the ceiling face 16b of the enclosure 16 and the three second ribs 18b1, 18b2, 18b3 disposed on the lid 18 to be secured in place. With the above described configuration, the lamp module 14a can be fixed in the enclosure 16 by a simple structure using only one screw. Furthermore, even if the projector is subjected to a shock, the optical axis is prevented from easily deviating by the shock absorbing effect of the two positioning pins 15b2, 15b3, the screw 19, and the ribs.

C. Example of Variation

Figure 7:
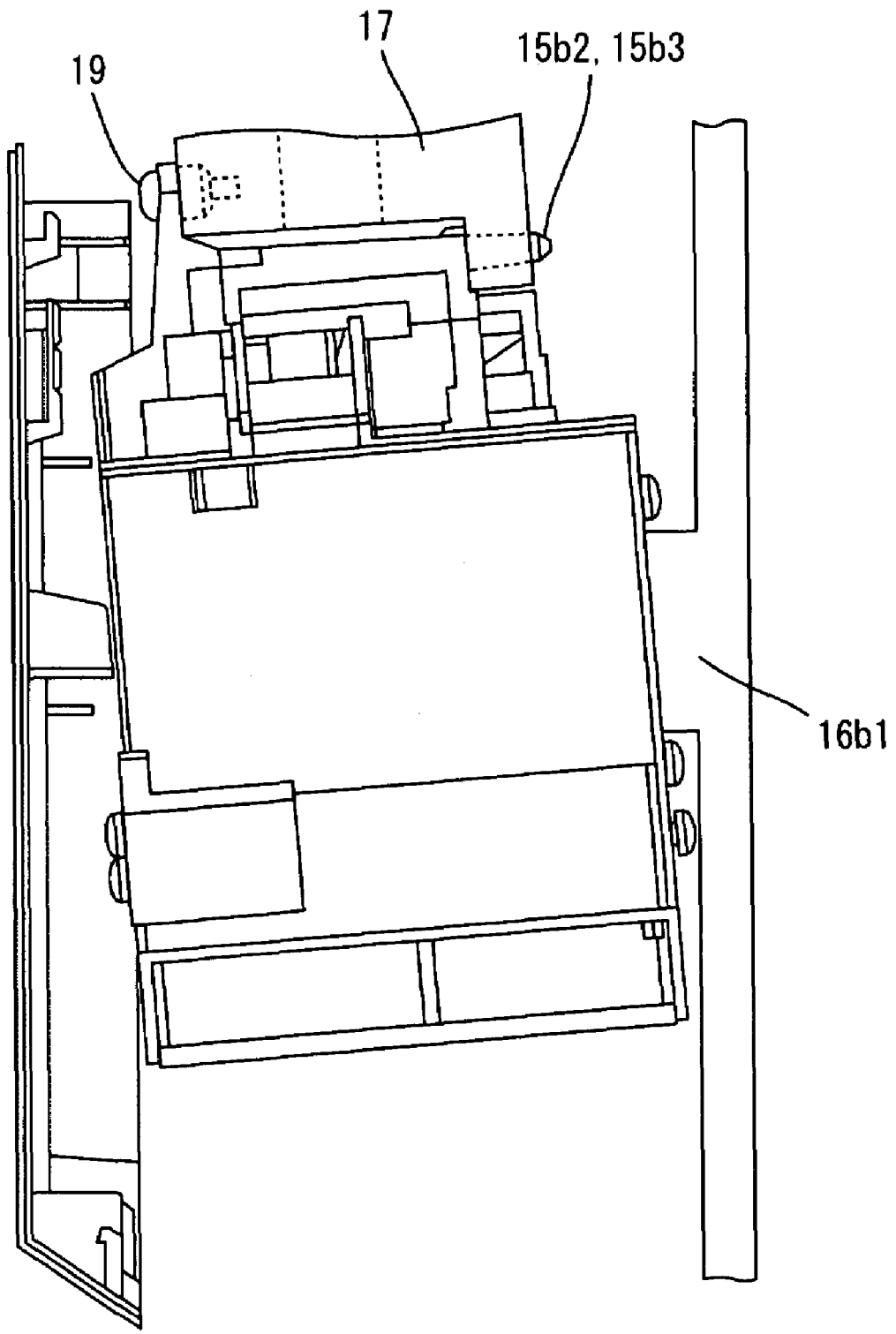
FIG. 7 is an exemplary enlarged view of a lamp module received in an enclosure.
Figure 8:
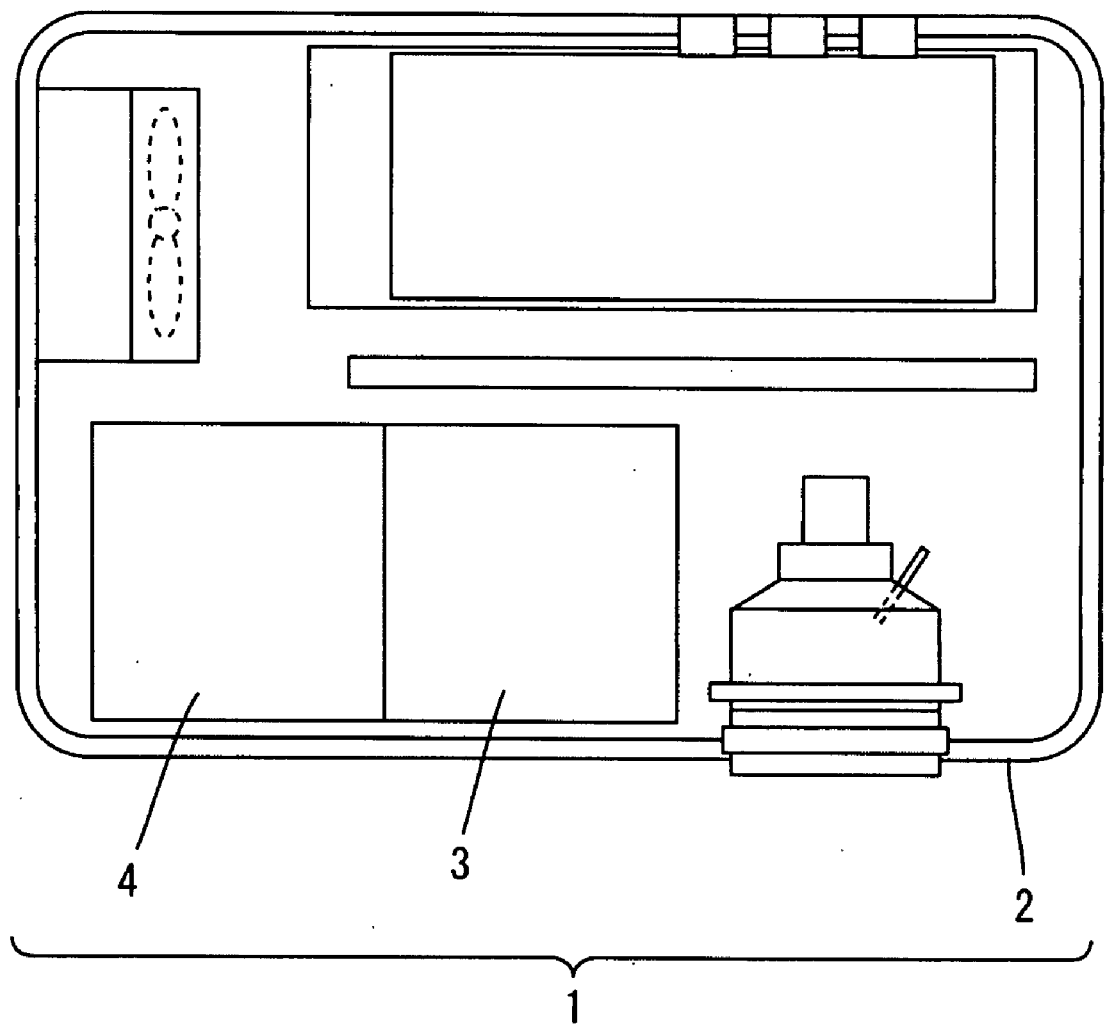
FIG. 8 is an exemplary block diagram of a related projector.

In the configuration described above, the lamp module 14a is arranged to be supported between the first rib 16b1 and the second ribs 18b1, 18b2, 18b3. However, it becomes easier to assemble the lamp module 14a into the enclosure by modifying the shape of the first rib 16b1. FIG. 7 is an enlarged view of the lamp module 14a received in the enclosure 16. Referring to FIG. 7, while the lamp module 14a is fixed in the enclosure 16 by being supported vertically, there is formed a small gap between the first rib 16b1 and the lamp case 15 of the lamp module 14a.

In the present embodiment, the gap between the lamp case 15 and the first rib 16b1 is set to be approximately 0.5 mm. By this design, such a failure can be prevented that the lamp module 14a is fixed in place with its optical axis deviated from the correct path because of the first rib 16b1 and the outer face of the lamp case 15 interfering each other, when the lamp module 14a is fixed by means of the positioning pins 15b2, 15b3 and the screw 19, making it impossible for the positioning pins 15b2, 15b3 to be positively inserted.

D. Summary

In order to provide a projector having the lamp module and the enclosure fixed together by a simple structure in such a way that the optical axis does not deviate from the right path and even if the projector is subjected to a shock the optical axis is prevented from being easily deviated, the lamp module is provided with two positioning pins to be inserted into positioning holes made in the enclosure in its vertical direction thereby controlling movement of the lamp module in a horizontal plane and the enclosure is provided with a first rib extended inward from the inner wall of the ceiling face and second ribs extended inward from the inner wall of the bottom face. Thus, the lamp module is properly positioned in a horizontal direction by the positioning pins, and following fixation with one screw, the lamp module is vertically supported between the first rib and the second ribs so as to be received in the enclosure with the optical axis fixed.

It is aimed to provide, by a simple structure, a projector in which the lamp module and enclosure are securely fixed together so that the optical axis may not deviate and also the optical axis is prevented from deviating even if the projector is subjected to a shock.

In a first aspect of the present invention, while positioning pins are inserted into positioning holes in a fixing portion to perform positioning, a screw passed through a boss is engaged with a female screw in a socket portion, and thus, a lamp module, with its movement in a horizontal plane controlled, is received into a lamp module receiving portion. Then, by fastening a lid with screws to cover up an opening of the lamp module receiving portion, the lamp module is controlled in its vertical movement by a first rib formed on the bottom face of the lamp module receiving portion and second ribs formed on the lid. In this way, the lamp module is controlled in its movement in the horizontal direction and vertical direction and an optical axis of light emitted from the lamp module is fixed.

In another aspect of the present invention, a lamp module is controlled in its movement in a horizontal plane by having positioning pins inserted into positioning holes provided in a vertical direction in an enclosure and further the lamp module is received into the enclosure as supported vertically between a first rib and second ribs formed on the ceiling face and the bottom face of the enclosure, and therefore, the configuration can fix the lamp module within the enclosure by a simple structure and, even if it is subjected to a shock, it prevents the optical axis from deviating easily by virtue of the positioning pins and screw. Thus, it is made possible to fix the lamp module and the enclosure together, by a simple structure, so as not to cause a deviation of the optical axis, and also to provide a projector in which the optical axis can be prevented from easily deviating even if it is subjected to a shock.

As an example of the configuration of the second ribs, the second ribs are formed on the lid member serving as the bottom face. Therefore, when the second ribs are formed, they can be formed separate from the main body side of the enclosure. Thus, manufacturing of the enclosure having the first rib and the second ribs thereon can be made easier.

As a concrete example of the shape of the second ribs, each of the second ribs is formed to have a U-shaped cross-section. Accordingly, when subjected to a shock, the impulse can be absorbed by the U-shaped cross-section and, further, the shape of the bottom plate of the enclosure is prevented from producing deformation due to shrinkage during the manufacture of the second ribs.

As a concrete example of the shape of the first rib, a small gap is formed between the lamp module and the first rib, and therefore, when the lamp module is assembled into the enclosure, a deviation of the optical axis due to interference between the first rib and the lamp module can be prevented.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, the inductors can be hollow tubular coils. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A projector comprising:
   a lamp module for receiving therein a lamp as a light source; and
   an enclosure for allowing an optical axis of the light source from said lamp module to be fixedly aligned to a predetermined direction by covering, with a lid, an opening of a lamp module receiving portion for receiving therein said lamp module;
   said lamp module having two positioning pins embedded therein in a substantially vertical direction to said optical axis for controlling movement of said optical axis in a horizontal plane, and a boss allowing a screw to pass through the boss in parallel with an embedded position of said pins;
   said enclosure having a first rib extended inward from a back side of a ceiling face that is a bottom face of said lamp module receiving portion and three second ribs, each of the three second ribs having a substantially U-shaped cross-section, embedded upright from said lid in a triangularly arrangement such that when said lamp module is received in said lamp module receiving portion, a small gap is formed between said enclosure and said lamp module; and
   said lamp module receiving portion having a positioning portion including positioning holes allowing the two positioning pins to be inserted therein and a socket portion provided with a female screw engaging the female screw passed through said boss,
   while being properly positioned by said positioning pins inserted into the positioning holes of said positioning portion, said lamp module is received into said lamp module receiving portion with a movement of said lamp module in a horizontal plane controlled by the screw passed through said boss and engaged with the female screw in the socket portion, and said opening in said lamp module receiving portion is covered with the lid fastened with screws such that movement of said lamp module in a vertical direction is controlled by said first rib and said second ribs in order for the optical axis to be fixed.

2. A projector comprising:

a lamp module for receiving therein a lamp as a light source;

an enclosure fixing said lamp module therein such that an optical axis of said lamp module is kept in a predetermined direction;

two positioning pins provided on said lamp module and inserted into positioning holes made in a vertical direction to said enclosure for controlling movement of said lamp module in a horizontal plane; and a first rib provided on said enclosure as extended inward from an inner wall of a ceiling plate and second ribs provided on said enclosure as extended inward from an inner wall of a bottom plate, said lamp module is fixed in said enclosure and secured by one screw while said lamp module is positioned within a horizontal plane by said positioning pins, and further is vertically supported between said first rib and second ribs.

3. The projector as set forth in claim 2 wherein:

said enclosure receives the lamp module into a lamp module receiving portion having an opening made in its bottom face and secures the lamp module therein by having the opening covered with a lid, and said second ribs are formed on a face of said lid opposing said lamp module.

4. The projector as set forth in claim 2 wherein:

said second ribs each have a U-shaped cross-section.

5. The projector as set forth in claim 2 wherein:

when said lamp module is fixed in said enclosure, said first rib is extended such that a small gap is formed between the same and said lamp module.

* * * * *